US009732266B2

(12) United States Patent
Hermes

(10) Patent No.: US 9,732,266 B2
(45) Date of Patent: Aug. 15, 2017

(54) LOW-MELTING ELEMENTAL METAL OR FUSIBLE ALLOY ENCAPSULATED POLYMERIZATION INITIATOR FOR DELAYED INITIATION

(71) Applicant: Los Alamos National Security, LLC, Los Alamos, NM (US)

(72) Inventor: Robert E. Hermes, White Rock, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 83 days.

(21) Appl. No.: 14/945,188

(22) Filed: Nov. 18, 2015

(65) Prior Publication Data

US 2016/0068734 A1 Mar. 10, 2016

Related U.S. Application Data

(62) Division of application No. 13/081,935, filed on Apr. 7, 2011, now Pat. No. 9,217,101.

(51) Int. Cl.
*C09K 8/12* (2006.01)
*C09K 3/00* (2006.01)
*C09K 8/40* (2006.01)

(52) U.S. Cl.
CPC ............... *C09K 8/12* (2013.01); *C09K 3/00* (2013.01); *C09K 8/40* (2013.01)

(58) Field of Classification Search
None
See application file for complete search history.

(56) References Cited

U.S. PATENT DOCUMENTS

| 2,618,341 | A | | 11/1952 | Meddick |
| 4,417,028 | A | | 11/1983 | Azevedo |
| 5,147,744 | A | * | 9/1992 | Sacripante ......... G03G 9/0832 430/106.1 |
| 7,441,599 | B2 | | 10/2008 | Hermes et al. |
| 7,743,830 | B2 | | 6/2010 | Hermes et al. |
| 8,240,386 | B2 | | 8/2012 | MacKay |
| 2003/0196808 | A1 | | 10/2003 | Blauch et al. |
| 2006/0081374 | A1 | | 4/2006 | Bland et al. |
| 2008/0272331 | A1 | | 11/2008 | Mohapatra et al. |
| 2008/0277716 | A1 | | 11/2008 | Nishida et al. |
| 2010/0236780 | A1 | | 9/2010 | Hermes et al. |
| 2011/0073327 | A1 | | 3/2011 | Buergel |
| 2011/0155374 | A1 | | 6/2011 | Mackay |
| 2011/0234421 | A1 | | 9/2011 | Smith |
| 2012/0037368 | A1 | | 2/2012 | Eick et al. |

FOREIGN PATENT DOCUMENTS

WO    WO 2006/028806    3/2006

OTHER PUBLICATIONS

International Search Report for PCT/US2012/00194, mailed Jul. 18, 2012.
Weast, Robert C. (Editor), CRC Handbook of Chemistry and Physics, 60th Ed., 1979, p. F-24, Boca Raton, Florida.
Darley, et al., Composition and Properties of Drilling and Completion of Fluids, 5th Edition, 1988, pp. 544-624, Butterworth-Heinemann, Woburn, MA.
Odian, George, Principles of Polymerization, 3rd edition, 1991, pp. 212-215, John Wiley & Sons, Inc., New York.

* cited by examiner

*Primary Examiner* — John J Figueroa
(74) *Attorney, Agent, or Firm* — King & Spalding LLP

(57) ABSTRACT

An encapsulated composition for polymerization includes an initiator composition for initiating a polymerization reaction, and a capsule prepared from an elemental metal or fusible alloy having a melting temperature from about 20° C. to about 200° C. A fluid for polymerization includes the encapsulated composition and a monomer. When the capsule melts or breaks open, the initiator is released.

15 Claims, No Drawings

LOW-MELTING ELEMENTAL METAL OR FUSIBLE ALLOY ENCAPSULATED POLYMERIZATION INITIATOR FOR DELAYED INITIATION

CROSS REFERENCE TO RELATED APPLICATIONS

This non-provisional patent application is an divisional of U.S. Non-Provisional Patent Application No. 13/081,935, titled Low-Melting Elemental Metal or Fusible Alloy Encapsulated Polymerization Initiator for Delayed Initiation, filed on Apr. 7, 2011, which is hereby fully incorporated herein by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to polymerization initiators that are encapsulated by capsules of low-melting elemental metal or low-melting fusible alloy, and to fluids that include these capsules of polymerization initiators.

BACKGROUND OF THE INVENTION

Polymerization inhibitors are currently used for partially or fully inhibiting polymerization that may occur during storage or under certain process conditions. In practice, inhibiting a polymerization can become difficult because polymerization will almost always occur even when inhibitors are present, and especially if a polymerization initiator is also present.

The initiation of polymerization can be delayed by encapsulating the polymerization initiator with capsule of organic polymer. Encapsulation delays the initiation of the polymerization until the capsule of organic polymer dissolves or is otherwise compromised to release the initiator into the system containing the monomer.

Encapsulated initiators for polymerization reactions in wellbores have been described in U.S. Pat. No. 7,441,599 to Hermes et al. entitled "Controlling the Pressure within an Annular Volume of a Wellbore," incorporated by reference herein. The capsules manage the problem of annular build-up of trapped pressure, and would work for applications where polymerization, or activity of inorganic materials, could be delayed for relatively short periods (hours or days) of time. Once the capsule dissolves or is mechanically compromised, the active ingredients are released.

Sometimes a much longer delay than just a few hours or days may be needed. A delay longer than a few weeks may be needed. For various oil well related applications, such as those described in Hermes et al., a delay of months or even years may be needed. For example, Hermes et al. may require a delay of months or even years from the time of emplacement of a reactive spacer fluid that includes a polymerizable monomer to the time of completion of the well and/or production schedule. Capsules of soluble polymer are unsuitable for achieving such a long delay.

Suitable encapsulated compositions that can provide longer delays for initiating polymerization reactions, and other types of chemical reactions, are desirable.

SUMMARY OF THE INVENTION

To achieve the foregoing and other objects, and in accordance with the purposes of the present invention, as embodied and broadly described herein, the present invention provides an article of manufacture that is an encapsulated composition. The article of manufacture is a polymerization initiator composition in a capsule. The capsule includes a material that is an elemental metal or fusible alloy. The melting temperature of the elemental metal or fusible alloy chosen for the capsule is from about 20° C. to about 200° C. The polymerization initiator composition is for initiating a polymerization reaction of a monomer to form a polymer.

The invention also includes a fluid that includes these capsules of polymerization initiator. The capsules are dispersed in a fluid. The capsules are made of elemental metal or fusible alloy. The melting temperature of the elemental metal or fusible alloy chosen for the capsule is from about 20° C. to about 200° C. The elemental metal or fusible metal alloy is insoluble in the fluid and impermeable to monomer and other ingredients in the fluid. The polymerization of the monomer into polymer can be initiated by the initiator when the initiator is released from the capsule into the fluid. For the initiator to come into contact with the monomer in the fluid, the capsule must melt or become compromised in some way such that the initiator is released into the fluid that contains the monomer.

DETAILED DESCRIPTION

The invention relates to articles of manufacture that are capsules of a polymerization initiator composition. The invention also relates to fluids that include these capsules.

The capsules include elemental metal or fusible alloy. The capsules encapsulate the polymerization initiator. Fusible alloys are well known materials that have relatively low melting temperatures. They have been used in the past for such applications as fire sprinkler heads, turkey thermometers, and solder. Elemental metals and fusible alloys useful with this invention have a melting temperature in a range from approximately 20° C. to approximately 200° C.

Gallium and indium are examples of elemental metals that can be used as capsule materials.

Some fusible alloys that are useful as capsule materials are given in a table entitled "Low Melting Point Alloys" on page F-24 from the CRC Handbook of Chemistry and Physics, 60.sup.th edition, Robert C. Weast, Editor, Boca Raton, Fla., 1979, incorporated by reference. Table 1 below includes fusible alloys from page F-24, and also elemental metals, that are useful capsule materials for this invention.

TABLE 1

Elemental metals and fusible alloys

| Melting Temperature in ° C. | Name | Composition, wt % |
|---|---|---|
| 29.8 | Gallium | Ga (100) |
| 41.5 | Eutectic | Bi (40.3), Pb (22.2), In (17.2), Sn (10.7), Cd (8.1), Tl (1.1) |

TABLE 1-continued

Elemental metals and fusible alloys

| Melting Temperature in ° C. | Name | Composition, wt % |
|---|---|---|
| 46.5 | Quinternary eutectic | Sn (10.65), Bi (40.63), Pb (22.11), In (18.1), Cd (8.2) |
| 47 | Quinternary eutectic | Bi (44.7), Pb (22.6), Sn (8.3), Cd (5.3), In (19.1) |
| 58.2 | Quaternary eutectic | Bi (49.5), Pb (17.6), Sn (11.5), In (21.3) |
| 60.5 | Ternary eutectic | In (51.0), Bi (32.9), Sn (16.5) |
| 70 | Wood's Metal | Bi (50.0), Pb (25.0), Sn (12.5), Cd (12.5) |
| 70 | Lipowitz's Metal | Bi (50.0), Pb (26.7), Sn (13.3), Cd (10.0) |
| 70 | Binary eutectic | In (67.0), Bi (33.0) |
| 91.5 | Ternary eutectic | Bi (51.6), Pb (40.2), Cd (8.2) |
| 95 | Ternary eutectic | Bi (52.5), Pb (32), Sn (13.3) |
| 97 | Newton's Metal | Bi (50.0), Pb (18.8), Pb (31.2) |
| 98 | D'Arcet's Metal | Bi (50.0), Sn (25.0), Pb (25.0) |
| 100 | Onion's or Lichtenberg's Metal | Bi (50.0), Sn (20.0), Pb (30.0) |
| 102.5 | Ternary Eutectic | Bi (54.0), Sn (26.0), Cd (20.0) |
| 109 | Rose's Metal | Bi (50.0), Pb (28.0), Sn (22.0) |
| 117 | Binary Eutectic | In (52.0), Sn (48.0) |
| 120 | Binary Eutectic | In (75.0), Cd (25.0) |
| 123 | Malotte's Metal | Bi (46.1), Sn (34.2), Pb (19.7) |
| 124 | Binary Eutectic | Bi (55.5), Pb (44.5) |
| 130 | Ternary Eutectic | Bi (56.0), Sn (40.0), Zn (4.0) |
| 140 | Binary Eutectic | Bi (58.0), Sn (42.0) |
| 140 | Binary Eutectic | Bi (60.0), Cd 140(40.0) |
| 157 | Indium | In (100) |
| 183 | Eutectic solder | Sn (63.0), Pb (37.0) |
| 185 | Binary Eutectic | Tl (52.0), Bi (48.0) |
| 192 | Soft solder | Sn (70.0), Pb (30.0) |
| 198 | Binary Eutectic | Sn (91.0), Zn (9.0) |
| 199 | Tin foil | Sn (92.0), Zn (8.0) |
| 199 | White metal | Sn (92.0), Sb (8.0) |

Each elemental or fusible alloy useful with this invention has a melting temperature from approximately 20° C. to approximately 200° C. The materials in Table 1 have melting points that all are inside this range. It should also be understood that this list from Table 1 is not limiting and that other elemental metals or metal fusible alloys may be used having melting temperatures no lower than 20° C. and no higher than 200° C. may be used as capsule materials In this invention, elemental metals or fusible alloys are used to make capsules for encapsulating polymerization initiators. Polymerization cannot be initiated because the capsules of elemental metals or fusible alloys are insoluble in monomer, and the capsules are impermeable to monomer. Thus, a delay in initiation of polymerization by months or even years is provided by these capsules until the capsules are broken open or melted. Melting may take place for example, during a thermal event associated with production from a hot reservoir (see Hermes et al., vide supra). When the encapsulated initiators are dispersed in a fluid in the casing annuli of an oil well, gas well, geothermal well, or the like, polymerizations may take place after the capsules melt or are broken to release the initiator.

Preferable elemental metals and fusible alloys useful for making capsules according to this invention have melting temperatures above 25° C. and below 157° C. The choice of elemental metal or fusible alloy may depend on, for example, the melting temperature of the initiator if release of initiator as a solid is desired. It may be preferable, but not necessary, that the capsule have a melting temperature below the melting temperature (or range of melting temperatures) for the initiator. If the melting temperature of the initiator is greater than that for the capsule, the initiator is released as a solid when the capsule melts or breaks open. Typically, the solid initiator will be released and then dissolve in the monomer or other constituents of fluid in the casing annuli and then initiate polymerization of the monomer, which is also present in this fluid.

The size of the capsule should not be too large to avoid settling out over time, which would result in a localized polymerization. An appropriate size to avoid this settling out would be from approximately one micrometer in diameter to approximately 2 millimeters (2000 micrometers). Capsules of this size are incorporated into a fluid. The capsules remain in suspension in the fluid. In some embodiments, the fluid is a weighted fluid known in the art as a drilling fluid or spacer fluid. This weighted fluid is used in the well drilling industry. Weighted fluids may be water-based or oil based. These types of fluids that are water-based generally include water, ionic and nonionic surfactants (for example, sodium dodecylsulfate, benzyl trialkylammonium chloride, polysorbates such as polyoxyethylene (20) sorbitan monolaurate, and the like) suspension agents (for example, bentonite clay, attapulgite (fullers earth, and the like)), thickening agents (for example, xanthan gum, guar gum, synthetic polymers, and the like), and weighting agents (for example, barite, hematite, and the like). These surfactants, suspension agents, thickening agents, and weighing agents participate in maintaining the rheological properties of the drilling and/or spacer fluid (see "Composition and Properties of Drilling and Completion Fluids," 5$^{th}$ Ed., H. C. H. Darley, and G. R. Gray, Butterworth-Heinemann, publisher. Chapter 11, which is entitled "Drilling Fluid Components," is incorporated by reference in its entirety). The upper limit to the size (diameter) for the capsules of approximately 2000 micrometers allows the addition of the capsules of polymerization initiator composition into typical drilling and/or spacer fluids while allowing the fluids to be pumped with conventional oil-field pumps. This would be similar to the size of granular propping agents used in well fracturing operations.

These types of fluids that are oil-based generally include oil, ionic and nonionic surfactants (for example, sodium dodecylsulfate, benzyl trialkylammonium chloride, polysorbates such as polyoxyethylene (20) sorbitan monolaurate, and the like) suspension agents (for example, bentonite clay, attapulgite (fullers earth, and the like)), thickening agents (for example, xanthan gum, guar gum, synthetic polymers, and the like), and weighting agents (for example, barite, hematite, and the like). These surfactants, suspension agents, thickening agents, and weighing agents participate in maintaining the rheological properties of the drilling and/or spacer fluid (see "Composition and Properties of Drilling and Completion Fluids," 5$^{th}$ Ed., H. C. H. Darley, and G. R. Gray, Butterworth-Heinemann, publisher. Chapter 11, which is entitled "Drilling Fluid Components," is incorporated by reference in its entirety). The upper limit to the size (diameter) for the capsules of approximately 2000 micrometers allows the addition of the capsules of polymerization initiator composition into typical drilling and/or spacer fluids while allowing the fluids to be pumped with conventional drilling operation pumps. This would be similar to the size of granular propping agents used in well fracturing operations.

A variety of methods described below may be used to fabricate the capsule of initiator. Using any of these methods, the resulting capsule of initiator would typically contain from approximately 50% to approximately 95% by volume of the initiator and approximately 5% to approximately 50% by volume of the elemental metal or fusible alloy. A preferred embodiment includes approximately 80% to approximately 95% by volume of the initiator and approximately 5% to approximately 20% by volume of the elemental metal or fusible alloy. In a preferred embodiment, the capsule size will be from approximately 10 micrometers to approximately 2 millimeters in diameter.

In an embodiment, the capsule and initiator are coextruded as encapsulated droplets. This embodiment of the invention involves preparing a composite melt of the elemental metal or fusible alloy and the initiator. In this embodiment, the initiator can be a solid or it can be melted. Next, the composite melt is extruded to form droplets of encapsulated initiator. Examples of capsules prepared by extrusion according to this embodiment have sizes (diameters) from several tens of micrometers (i.e. of approximately 20 micrometers, of approximately 30 micrometers, of approximately 40 micrometers, of approximately 50 micrometers, or approximately 60 micrometers, of approximately 70 micrometers, etc.) to several hundreds of micrometers (approximately 200 micrometers, approximately 300 micrometers, approximately 400 micrometers, approximately 500 micrometers, approximately 600 micrometers, approximately 700 micrometers, etc) to approximately 2000 micrometers. The sizes of the droplets depend on the double orifice used and conditions for the extrusion. The droplets should not be larger than approximately 2000 micrometers because they might not be pumpable in fluids using standard pumps used in drilling operations. For example, the temperature(s) for extrusion and solidification may be chosen as appropriate for the particular melting points of both the initiator and the elemental metal or fusible alloy, with solidification into a pinhole-free capsule.

In another embodiment, an encapsulated initiator is prepared by a physical vapor deposition method. In this embodiment, the elemental metal or fusible alloy is physically deposited onto the initiator using vacuum physical vapor deposition. The result is a pinhole-free capsule of polymerization initiator. An advantage of this method is that, because the capsule is formed under vacuum, the capsule would collapse when it melts, thereby promptly exposing the initiator to monomer in the fluid. For example, a puck of the elemental metal or fusible alloy composition is placed in a vacuum chamber, and an ion beam is used to melt the elemental metal or fusible alloy in vacuo, allowing the vapors of the elemental metal or fusible alloy to impinge upon particles of polymerization initiator, held at a temperature below the solidification temperature of the elemental metal or fusible alloy composition. A mechanical mixing device stirs the coated initiator to provide complete surface coverage of the initiator, thereby providing a pin-hole free capsule of the elemental metal or fusible alloy composition that coats the initiator.

In another embodiment, an encapsulated initiator is prepared by thermally spraying the elemental metal or fusible alloy onto the initiator particles as a pin-hole free coating. This method can be done at atmospheric pressure, or above atmospheric pressure. The elemental metal or fusible alloy composition is melted, and compressed air or inert gas is used to deliver the melted elemental metal or fusible alloy composition to an orifice that is held at an elevated temperature above the melting point of the elemental metal or fusible alloy composition, which is sprayed upon a container with the solid initiator, held at a temperature below the melting point of the elemental metal or fusible alloy composition so that solidification is achieved. The encapsulated polymerization initiator is mixed, which results in pinhole-free capsules.

In yet another embodiment, an encapsulated initiator is prepared by a fluidized bed coating of elemental metal or fusible alloy onto the initiator particles as a pin-hole free coating. In this embodiment, a fluidized bed is prepared with solid particles of the initiator. Melted elemental metal or fusible alloy composition is introduced in the usual manner for a fluidized bed apparatus. This method results in a pinhole-free coating of the elemental metal or fusible alloy composition onto the initiator particles.

In another embodiment, an encapsulated initiator is prepared by forming a solid cup of elemental metal or fusible metal alloy. The initiator is placed into the cup, and afterwards the cup is sealed to form the capsule. A capsule was prepared according to this embodiment (Example 1, vide infra) and demonstrated in a redox polymerization of an emulsified monomer in water (Example 2, vide infra). Optionally, a soluble dye may be added as a visualization aid. In Example 1, a dye was added for this purpose.

Encapsulation of the initiator confines the initiator. The monomer does not dissolve the capsule. The capsule is also impermeable to the monomer.

A wide variety of polymerization initiators may be used. These initiators must be capable of initiating the polymerization of the chosen monomer. Initiators could be water soluble. Initiators could be oil soluble.

Azo compounds are useful initiators for this invention. Several azo compounds that are useful as encapsulated polymerization initiators for this invention are listed in Table 2 below.

TABLE 2

| Chemical Name of initiator | Melting Temperature Range (° C.) |
| --- | --- |
| 2,2'-Azobis(2-methylpropionamidine)dihydrochloride | 160-169 |
| 2,2'Azobis[2-(2-imidazolin)-2-yl)propane]dihydrochloride | 188-193 |
| 2,2'-Azobis[2-methyl-N-(2-hydroxyethyl)propionamide | 140-145 |

Other compounds that may be useful polymerization initiators include, but are not limited to, azo and peroxide initiators described in Odian, "Principles of Polymerization," 3rd edition, John Wiley & Sons, Inc., New York, 1991. On pp. 212-215 of Odian, incorporated by reference, several azo initiators that are described that are useful with this invention are 2'-azobisisobutyronitrile (AIBN), 2,2'-azobis (2,4-dimethylpentanenitrile) 1,1'-azobis(cyclohexanecarbonitrile).

Peroxides may be used. Table 3-3 on page 215 of Odian is incorporated by reference and lists peroxides that may be used as encapsulated initiators for this invention. They include benzoyl peroxide, lauryl peroxide, and cumyl peroxide.

Oxidation-reduction reactions may produce radicals that can initiate polymerization. Thus, redox initiators may be used as encapsulated initiators. An advantage of such initiators is that radical production occurs at reasonable rates over a wide range of temperatures, depending on the redox system. Potassium persulfate is an example of a redox initiator that may be used with this invention.

In an embodiment, an encapsulated initiator can have a single initiator inside the capsule of elemental metal or fusible alloy. In another embodiment, an encapsulated initiator can have two initiators. In other embodiments, encapsulated initiators can have three or more initiators.

Any monomer capable of being polymerized with the aid of an initiator may be used. Some non-limiting examples of monomers include acrylates, methacrylates, acrylic esters, methacrylic esters, butadiene, styrene, vinyl chloride, N-vinylpyrrolidone, and N-vinylcaprolactam. Methyl methacrylate, for example, is a useful monomer.

Fusible metal alloys are known to melt at various temperatures depending upon their compositions. In an aspect of this invention, fusible metal alloys are used as encapsulants for active components (initiators, inorganic compositions, and the like) for polymerization. The encapsulated polymerization initiators are generally solids with a higher melting temperature than that for the fusible metal alloy encapsulant.

An advantage of the fusible metal alloy capsules compared to a soluble polymer encapsulated initiator is that the fusible metal alloy capsule does not dissolve in either monomer or water. In an application related to the use of encapsulated initiators described by Hermes, this is advantageous because water and monomer are both present in the trapped annular pressure shrinking spacer fluid (see Hermes, vide supra). Another advantage related also to wellbore applications is that the fusible metal alloy is of sufficient mechanical strength that it survives the pumping process as it travels down hole during placement. Then, under thermal change, which could occur months or even years after placement, the fusible metal alloy encapsulant melts and releases the initiator system, which allows for polymerization to occur.

An aspect of this invention relates to using polymerization initiators encapsulated with fusible alloys in the drilling industry wherein timing of a polymerization of a monomer system in a well borehole is needed. Any monomer system may be used.

An aspect of the invention relates to the polymer industry. Encapsulated initiators of this invention may be useful in controlling the point at which introduction of initiators into a monomer system would be beneficial to the polymerization process. These initiators are released at certain temperatures into the monomer system. These temperatures are the melting points of the fusible metal alloys that are the encapsulants of the encapsulated initiators according to this aspect of the invention.

The following non-limiting Examples illustrate preparation of encapsulated polymerization initiators. The capsules were made from Wood's Alloy obtained from BAKER. Dyes were added in order to test the integrity of the capsule seal. It should be understood that these specific dyes are only exemplary, as any soluble dye could be used for this purpose.

EXAMPLE 1

Preparation of an encapsulated polymerization initiator: Wood's Alloy was melted and formed into two cups having approximately the same shape with a diameter of approximately 7 millimeters. One of the cups was filled with potassium persulfate, a water soluble polymerization initiator, and powdered fluorescein (SIGMA-ALDRICH), a water soluble dye. The capsule was formed by sealing this cup to the second cup at atmospheric pressure with a hot knife. The capsule was approximately 5 millimeters thick by 6 millimeters in diameter in the shape of a cylinder. The capsule was rinsed with water and observed for any color change due to the green dye to ensure no leakage was occurring.

EXAMPLE 2

Polymerization using the encapsulated initiator of Example 1: The capsule prepared according to Example 1 was then placed into a test tube containing an emulsified mixture of methyl methacrylate, water, a surfactant, iron sulfate, and sodium metabisulfite. The iron sulfate and sodium metabisulfite are co-initiators for redox polymerization. This emulsified mixture undergoes an emulsion redox polymerization when activated by potassium persulfate. The test tube was immersed into a beaker of hot water being heated on a hot plate with magnetic stirrer for thermal control, and a thermocouple for monitoring the temperature. As the temperature increased, the emulsion began to phase separate and the capsule could be clearly seen as a semi-melted cylinder at a temperature of 76° C. At a temperature of 88° C., the cylinder melted and was transformed into a semi-spherical bead. Under further heating, the gas pressure inside the melted capsule increased until it broke the surface tension of the metal and released its contents. The temperature at which this occurred was 91.5° C., and rapid polymerization followed. No polymerization occurred until after the melted capsule released its contents.

In a hypothetical embodiment, an encapsulated initiator of this invention is prepared and used for application related to wellbores drilled into the ocean floor for subsequent oil production. This type of application has been described by Hermes et al. (vide supra, incorporated by reference). The encapsulated initiator is introduced into a weighted fluid known in the well drilling art as a drilling fluid. Examples of a drilling fluid are a spacer fluid and a drilling mud. A spacer fluid is used in an annulus as the trapped annular pressure shrinking fluid. The capsules of polymerization initiator are added to the fluid. The resulting fluid, which contains these capsules and monomer capable of being polymerized by the initiator in these capsules, is pumped downhole and then back up the annulus being treated. During placement, the maximum temperature experienced by the fluid during placement is below the melting temperature of the elemental metal, or fusible alloy, encapsulant, so that the capsule does not melt during placement of the fluid in the annulus. The maximum temperature of the annulus is also below the melting temperature of the elemental metal or fusible alloy of the capsules. After filling the annulus with this spacer fluid, the annulus is sealed by a typical cementation process used for the casing(s). The capsules of initiator are suspended in the fluid. They do not sink to the bottom but remain suspended in the fluid inside the annulus. Other components of the fluid are responsible for suspension of the encapsulated initiator in the annulus. Cementing completes this portion of the hole. While the rest of the hole is completed, the encapsulated initiators remain suspended in the annulus, and they do not break open, and the temperature in the annulus at this time is a very cold temperature that is too cold for melting the capsules. Therefore, polymerization is delayed. The rest of the hole is completed when the production of oil is started from the "pay zone", which is at a temperature that is typically higher than 80° C. Thus, the oil is hot at the bottom of the well. There is enough thermal conductivity to the annulus as the oil moves upwards through the hole and towards the annulus where the fluid containing monomer and capsules to provide a high enough of a temperature to melt the capsules made from elemental metal or fusible alloy, thereby releasing the initiator. The fluid also includes monomer. As oil is released from the pay zone, it rises upwards through the well and when it contacts the annulus, it increases the temperature of the annulus and of the fluid inside the annulus. As the temperature of the fluid increases, the fluid expands. The spacer fluid is sealed in the annulus and as it expands, it exerts increasing pressure on the annulus. Before the pressure becomes high enough to cause damage (collapsing and/or bursting the annulus) and ruin the oil well, the capsules melt, releasing the suspended initiator into the fluid, which causes polymerization of the monomer. Polymerization of the monomer results in shrinkage of the fluid, which eliminates or at least reduces the pressure exerted by the fluid on the annulus (see Hermes, vide supra). The fluid does not see the higher temperature as it is pumped into downhole and up into the annulus because the circulation of the drilling fluids prior to placement cools down the geologic formation because the drilling fluid has to go through several thousand feet of very cold to icy ocean water during the circulation. This can cool the bottom of the formation from perhaps 80° C. or higher to perhaps 30° C. or 40° C., which is below the melting temperature of the chosen elemental metal or fusible alloy.

Although the present invention has been described with reference to specific details, it is not intended that such details should be regarded as limitations upon the scope of the invention, except as and to the extent that they are included in the accompanying claims.

I claim:

1. An article of manufacture comprising an encapsulated polymerization initiator composition for initiating a polymerization reaction of a monomer to form a polymer; said encapsulated polymerization initiator composition comprising:
   a polymerization initiator; and
   a metal capsule encapsulating the polymerization initiator composition, said metal selected from an elemental metal or a fusible alloy, said metal capsule having a melting temperature from about 20° C. to about 200° C.

2. The article of manufacture according to claim 1, wherein the encapsulated polymerization initiator composition further comprises a dye.

3. The article of manufacture according to claim 1, wherein a pressure inside the capsule is less than atmospheric pressure.

4. The article of manufacture according to claim 1, wherein a pressure inside the capsule is greater than atmospheric pressure.

5. The article of manufacture according to claim 1, wherein a pressure inside the capsule is atmospheric pressure.

6. The article of manufacture according to claim 1, wherein the initiator is selected from an azo initiator, a peroxide initiator, or a redox initiator.

7. The article of manufacture according to claim 1, wherein said elemental metal is Ga or In.

8. The article of manufacture according to claim 1, wherein said fusible alloy includes Bi.

9. The article of manufacture according to claim 1, wherein said fusible alloy includes Sn.

10. The article of manufacture according to claim 1, wherein said fusible alloy includes Pb.

11. The article of manufacture according to claim 1, wherein said fusible alloy includes Cd.

12. The article of manufacture according to claim 1, wherein said fusible alloy includes Zn.

13. The article of manufacture according to claim 1, wherein said fusible alloy includes In.

14. The article of manufacture according to claim 1, wherein said fusible alloy includes Tl.

15. The article of manufacture according to claim 1, wherein said fusible alloy includes at least two metals selected from Bi, Pb, In, Cd, Tl, Sn, and Zn.

* * * * *